June 27, 1967

J. B. SIGETY ETAL 3,327,839

CONVEYOR APPARATUS

Filed July 8, 1965

INVENTORS
JAMES M. STEWART
JULIUS B. SIGETY
RAYMOND H. HARBIN
ORLAN M. ARNOLD

BY Curtis, Morris + Safford
ATTORNEY

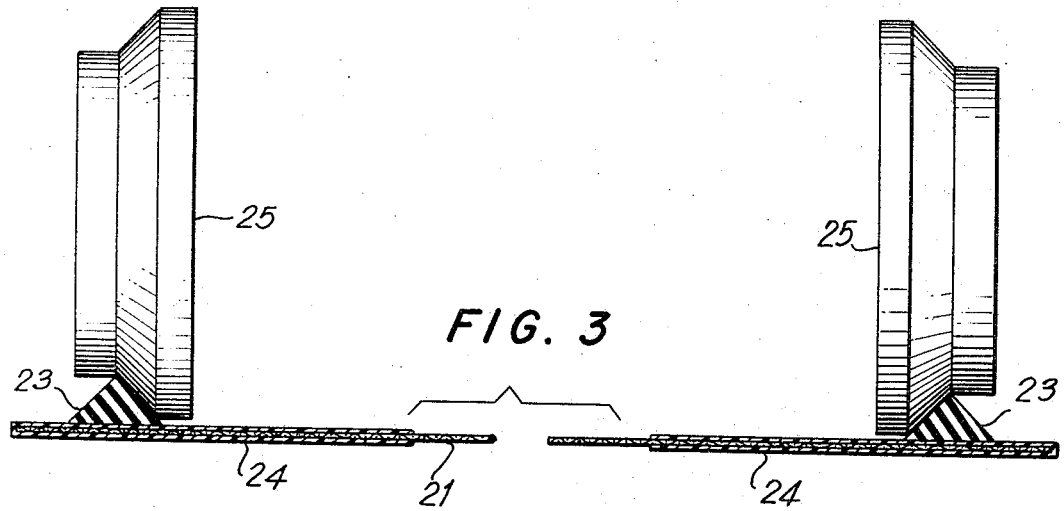
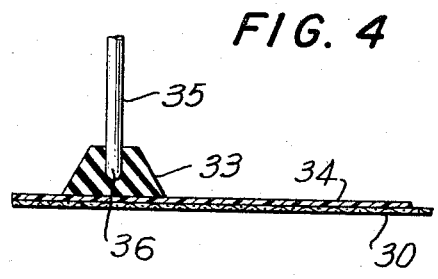
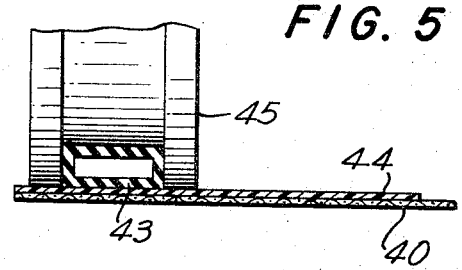
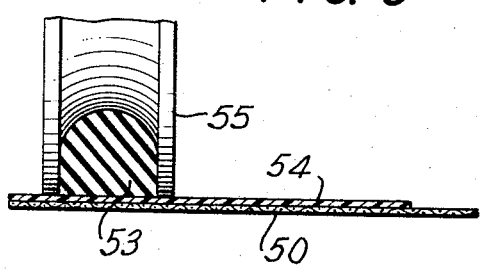
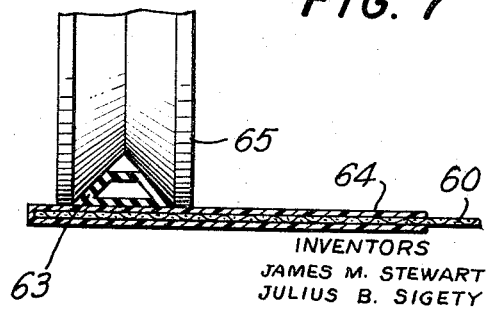

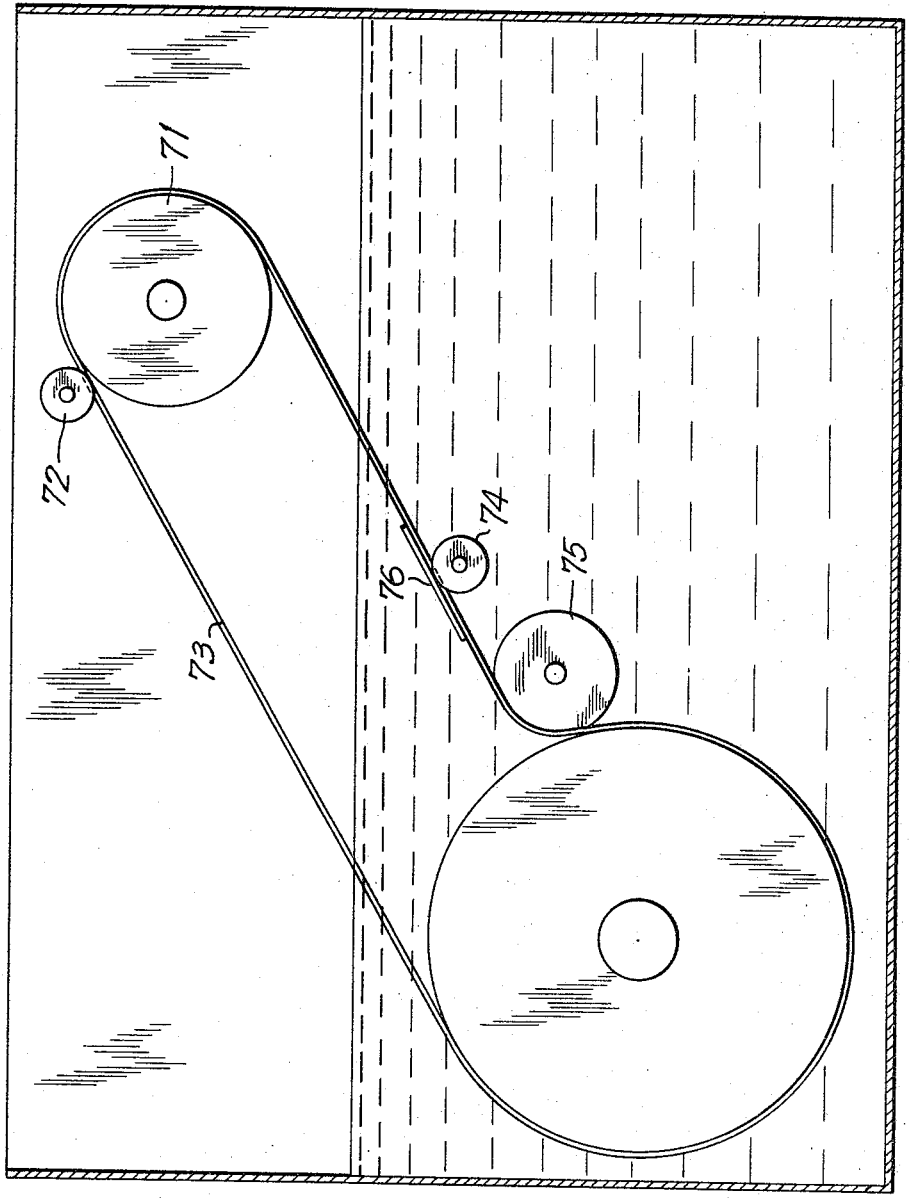

3,327,839
CONVEYOR APPARATUS
Julius B. Sigety, Detroit, Orlan M. Arnold, Grosse Pointe Park, James M. Stewart, Dearborn, and Raymond H. Harbin, Livonia, Mich., assignors to Ajem Laboratories, Inc., Livonia, Mich.
Filed July 8, 1965, Ser. No. 470,527
5 Claims. (Cl. 198—202)

The present invention relates, in general, to conveying machinery employing belts of substantial length and, in particular, to apparatus for maintaining such belts on predetermined paths. Although the invention has particular application in a filtration unit utilizing a mesh screen belt and will be described in this environment, the problems solved by the invention are likely to arise in other systems employing conveyor belts so that the invention has considerably broader application and may be advantageously employed elsewhere.

In most industrial situations where a filtration unit is employed, it is undesirable to discard, after a single use, the liquids in the filtering process. Where, for example, the liquid employed is a relatively expensive oil, cutting coolant or cleaning solution contaminated by chips or dirt, the discharge after a single use of this liquid has a direct effect on the expense of the operation. Where the liquid employed is water or a water solution, it is desirable to recirculate the water or water solution instead of discharging it after a single use in order to avoid a capital expenditure of additional water supply lines. It is also necessary to recirculate the water or water solution where the local supply of water is restricted or the discharging of wastes is prohibited because of the possibility of polluting a river or stream into which the liquid is discarded.

In the usual filtration unit, a belt of substantial length, in the form of a mesh screen, passes through a tank in which the wastes of a dirty liquid are collected. The wastes settle on the mesh screen belt as the liquid is cleaned and the cleaned liquid is recycled through the filtration unit. After the screen belt emerges from the liquid, the wastes are removed by suitable means. Such means may include scraping or dumping the wastes into receptacles or wastes may be carried off the screen by flushing liquid or blowing air or steam through the screen. The screen belt may be in the form of an elongated strip which unwinds from a supply roll or it may be in the form of an endless belt.

It has long been a problem in the conveyor art to maintain the conveyor belts along predetermined paths. This problem has been especially acute in the filtration unit art because of the form and construction of the filter belts. As the screen belt moves over the various drums or rollers which provide the drive to the belt, the belt tends to be displaced laterally both while submerged in the contaminated liquid and while passing above this liquid. In certain instances, this lateral movement of the screen belt is due to the power drive imparted to the belt through the drums or rollers. Where, for example, the screen is in the form of an endless belt and a number of power drums are multiple power driven with a differential of speed from one to the other to provide the proper tautness to the belt, a slight differential tension on one side or the other of the screen tends to move the screen sidewards from its normal path of travel. In other instances, the lateral movement of the screen belt is due to variations in its own dimensions. If the screen belt is improperly constructed so as to have different linear dimensions along its edges or if properly constructed, but subjected to varying tensions at different points which may cause the belt to stretch, the belt will lose its tendency to stay in position because of these slight differences in dimensions.

A number of proposed solutions to this problem of lateral movement of the screen belt have met with only varying degrees of success. None of these solutions appear to be entirely satisfactory for the requirements of present day filtration units. One of the approaches taken to solve this problem has been the very careful adjustment of the drum rollers which drive the belts. Besides the usual disadvantages associated with making very careful adjustments to machines, it has been found that even after careful adjustments have been made to the drum rollers at frequent intervals, after a relatively short period of operation the screen belts stretch at certain points in an irregular manner and become distorted with the result that the belts again undergo lateral movements.

Other attempts to solve the problem of lateral movement of the screen belts have generally involved the use of guide members on the belt which engage stationary guides attached to the frame of the filtration unit. While such techniques have proven satisfactory for slight lateral movements of the belt, it has been found that for highly distorted screen belts which move sidewards an appreciable distance the stresses experienced by the guides and the guide members cause the guide members on the belt to tear loose from the belt or bend the screen at the points at which the guide members are anchored to the belt. Such results make the use of an inexpensive filter belt impractical since such filters are generally too weak to sustain the stresses developed and are more vulnerable to abrasions. Even the more expensive filter belts which are more rugged often become damaged after being subjected to repeated stresses. Besides causing damage to the filter belt itself, a broken filter belt allows the contaminated liquid to pass through into the chambers which should otherwise receive only clean liquid.

It is an object of the present invention to provide a new and improved conveyor apparatus.

It is another object of the present invention to provide apparatus which will maintain a belt in a conveying machine on a predetermined path.

It is a further object of the present invention to provide apparatus for guiding a mesh screen belt in a filtration unit along a predetermined path.

It is yet another object of the present invention to provide conveyor apparatus for guiding a mesh screen belt which does not subject the belt to cracking and tearing when the belt is constrained to follow a predetermined path.

It is a still further object of the present invention to provide apparatus for guiding a filter belt which is simple in construction and inexpensive to fabricate, service and maintain.

A feature of the present invention is that mesh screen filter belts having finer weave screens may be employed resulting in improved filtration.

It is an additional object of the present invention to provide apparatus for guiding a filter belt in a filtration unit which is not subject to the shortcoming and limitations mentioned above.

One form of the conveyor apparatus constructed in accordance with the present invention and described hereinafter includes an elongated belt and a pair of rails, preferably flexible, extending along the edges of the belt and secured to the belt. Also included in this apparatus is a pair of fixed guides which are positioned one at each edge of the belt and along a predetermined path. The guides engage the rails in such a manner that the belt is constrained to follow the predetermined path.

For a better understanding of the present invention, together with other and further objects thereof, reference is made to the following description, taken in connection with accompanying drawings, and its scope will be pointed out in the appended claims.

Referring to the drawings:

FIGURE 3 illustrates a modified form of the conveyor apparatus of the present invention;

FIGURES 4 through 7, inclusive, illustrate additional modifications which may be made to the conveyor apparatus of the present invention; and FIGURE 8 illustrates the manner in which the present invention may be employed in a filtration unit.

Figure 1:
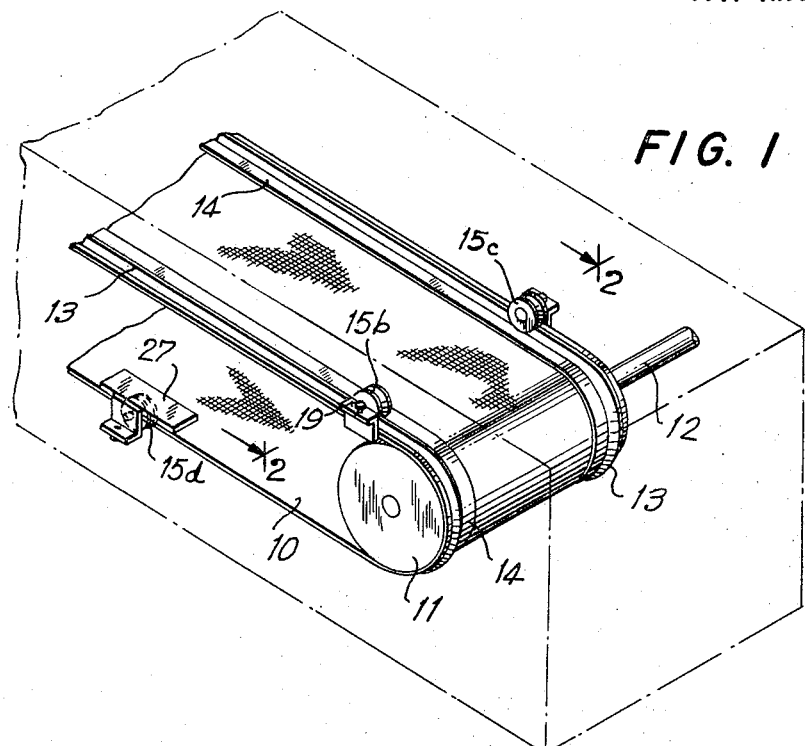
FIGURE 1 shows a conveyor apparatus constructed in accordance with the present invention.
Figure 2:
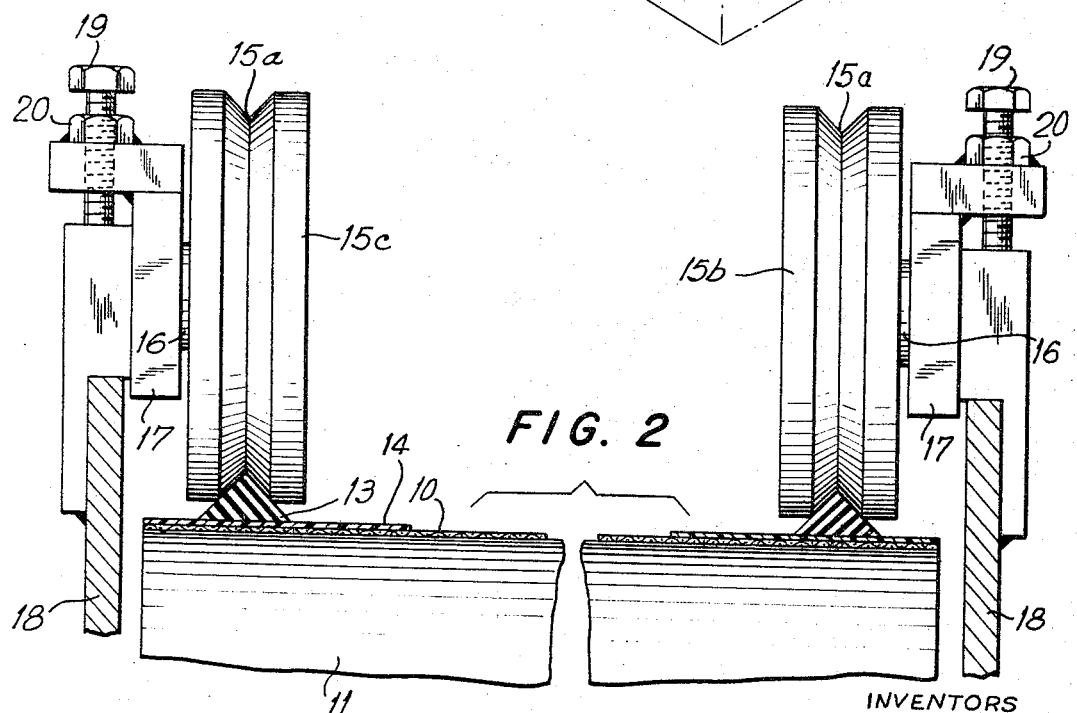
FIGURE 2 is a sectional view taken along line 2—2 in FIGURE 1.

Referring to FIGURES 1 and 2, one form of the conveyor apparatus constructed in accordance with the present invention includes an elongated belt 10 driven by a drum roller 11. Roller 11 is connected to a suitable drive mechanism (not shown) through a shaft 12 and imparts movement to the belt 10 either by means of driving friction contact or through a suitable sprocket arrangement. The belt 10 is in the form of an endless belt. When the invention is employed in a filtration unit, the belt 10 is in the form of a mesh screen of selected gauge as illustrated.

Secured to the belt 10 and extending along the edges of the belt is a pair of rails 13. The rails 13 are illustrated in FIGURE 1 as being continuous and are, for the embodiment being described, of triangular cross-section. Although not shown in FIGURE 1, the rails 13 extend completely along the edges of the belt 10. The rails 13 are preferably of a flexible material such as polyvinyl chloride polymers, rubber, neoprene, synthetic rubbers or polyurethane. It will be apparent that various other materials may be employed and that the selection is dependent upon the particular application, the nature of the filter liquid and the waste to be collected. The rails 13 are sufficiently flexible to permit passage of the belt 10 and the rails 13 about circular surfaces such as the drum roller 11 without the rails breaking or cracking.

The rails 13 are secured to the belt 10 by bonding the rails to a pair of flat edging strips 14 secured to the edges of the belt. The edging strips 14 may be formed, for example, by impregnation of the mesh screen with a flexible material such as polyvinyl plastic. Other materials that are chemically resistant to the filter liquid and the waste may also be employed. For the belt 10 illustrated in cross-section in FIGURE 2 the edging strips 14 are applied only on one side of the belt, but if desired the edging strips may be applied on both sides of the belt. The edging strips 14 may also be formed of fabric doubled over the edges of belt 10 and sewn to the screen.

The edging strips 14 prevent the flow of contaminated liquid underneath or through the edge of the mesh screen belt 10 into the chambers which should only receive clean liquid. In addition, by fabricating the edging strips of a low friction material, the movement of the screen belt 10 through the filtration unit is facilitated.

The edging strips 14 are made to be sufficiently flexible to permit passage of the belt 10 and the edging strips about circular surfaces such as the drum roller 11 without the strips breaking or cracking. In certain applications where it is desired to provide greater intermediate resiliency between the rail 13 and the belt 10, the edging strips 14 are fabricated of a more elastic material.

Instead of securing the rails 13 to the belt 10 through the edging strips 14, the rails may be directly affixed to the belt. This may be achieved by means of a heat thermal method in which the bonding edges of the rails are melted onto the screen. It should be pointed out that the rails and the edging strips may be formed as a single unit and applied to the screen by any of the suitable techniques already considered.

The conveyor apparatus illustrated in FIGURES 1 and 2 further includes fixed guides in the form of pulleys 15b, 15c and 15d. Pulleys 15b and 15c are positioned in close proximity to the drum roller 11 or may be positioned directly over the drum roller, while pulley 15d is positioned in a straight-a-way portion beneath the belt 10. A fourth pulley, hidden from view, would ordinarily be associated with pulley 15d and be positioned at the opposite edge of the belt 10. The pulleys, in pairs, are positioned at opposite edges of the belt 10 and along a predetermined path which is to be followed by the belt. The pulleys are disposed above or below the rails 13, dependent upon their location, and engage the rails in grooves 15a in the rims of the pulleys. Pulley 15d and other pulleys located in the straight-a-way portions of the belt 10 are provided with bearing surfaces, such as bearing plate 27, against which the belt bears as it passes the pulley. Pulleys 15b and 15c utilize the drum roller surfaces as bearing surfaces for the belt 10 so that no additional bearing plates need be provided at these locations.

For the particular embodiment illustrated, the grooves 15a are V-shaped and snugly engage the triangular rails 13. The pulleys turn on axles 16 mounted and anchored in adjustment bars 17. The adjustment bars 17 are attached to stationary mountings 18 which, in turn, are attached to the frame of the filtration unit. The adjustment bars 17 are movable vertically as bolts 19, captive in the stationary mountings 18, are turned into or out of nuts 20 secured to the adjustment bars. By turning the bolts 19 into or out of the nuts 20, thereby elevating or lowering the adjustment bars 17, the degree of engagement between the pulleys and the rails 13 is varied. In certain applications, it will be desirable to have the pulleys lightly engage the rails 13, while in other applications it will be desirable to have the two engage with considerable firmness and possible compression of the rails.

The pulleys are positioned along a predetermined path over which the belt 10 is to move. As the belt 10 moves, the pulleys engaging the rails 13 turn about axles 16 and constrain the movement of the belt to the predetermined path. From the mounting construction described above, it is apparent that the pulleys are immovable in the direction of movement of the belt 10. It may be desirable to mount the pulley assemblies on springs to provide vertical play. Such a mounting may be particularly advantageous where waste collects unevenly on the rails. Instead the resiliency of the rails 13 or the strips 14 or the resiliency of the combination of the two may be set to compensate for uneven waste collection.

FIGURE 3 illustrates a modification which may be made to the apparatus of FIGURES 1 and 2. In FIGURE 3, the pulleys 25 engage only the interior surfaces of the rails 23. For certain belt constructions, it is preferable to employ the pulleys shown in FIGURE 3 since pushing against the inner surfaces of the rails does not cause any doubling or wrinkling of the screen 21 during the lateral adjustment. It should also be noted that the belt 21 in FIGURE 3 is provided with the double sided edging strips 24 mentioned previously.

Referring to FIGURES 4 through 7, inclusive, there are shown alternate forms of the rails. In FIGURE 4, the rail 33 is a truncated triangle and is secured to the belt 30 by means of a single sided edging strip 34. The rail 33 is provided with a groove 36 extending vertically downward which is engaged by a rounded edge disc 35 instead of a pulley. It is also possible to employ pulleys such as the ones illustrated in FIGURES 1, 2 and 3 and provide the pulleys with a tongue for the engagement illustrated in FIGURE 4.

In FIGURE 5, the rail 43 is of rectangular cross-section and is secured to the belt 40 by means of a single sided edging strip 44. The rail 43 is engaged by a pulley 45 also of rectangular cross-section. FIGURE 5 also indicates that the rail may be hollow instead of being solid in cross-section. Hollow rails reduce the weight of the belt assembly.

In FIGURE 6, the rail 53 is of circular cross-section and is secured to the belt 50 by means of the single sided edging strip 54. The rail 53 may be a true semicircle or an extension of the full diameter as illustrated to provide an elongated vertical shape. The rail 53 is engaged by a pulley 55 having a cross-sectional shape similar to the shape of the rail.

In FIGURE 7, the rail 63 is a hollow truncated triangle and is secured to the belt 60 by means of a double sided edging strip 64. While in most cases, the preferred shapes of the pulleys correspond to the shapes of the rails, exact conformity of the two is not required. This is illustrated in FIGURE 7 where the pulley 65 is a full V-shaped groove, while the rail is a truncated triangle.

FIGURE 8 shows a filtration unit and illustrates the positions at which the guide pulleys may be located. One pulley 72 is positioned in close proximity to the drive drum 71 located above the contaminated liquid, while a second pulley 74 is positioned in the straightaway approach to the idler drum 75 immersed in the contaminated liquid. The pulley 74 has associated with it a bearing surface 76 against which the belt 73 bears as the belt passes this pulley. Where the contaminated liquid contains highly abrasive materials, it is advantageous to position the pulley near a drum, for example, the drive drum 71, and use the drum as the bearing surface to prevent scoring or damaging the belt 73 or the edging strips. Since the belt and drum move together, abrasive materials caught between the two also move with the belt and drum instead of remaining stationary with respect to the belt. If the belt were to move with respect to the abrasive material, the belt may become scored and scratched.

It may be desirable to employ only one pair of guide pulleys or to employ a plurality of pairs of pulleys in two or more locations in the filtration unit. Some may be near the drums, while others may be positioned in the straight-a-ways. Some of the pulleys may be immersed in the contaminated liquid, while others may be located above this liquid. Although, the pulleys in FIGURES 1 and 8 have been shown as single pairs, they may be arranged in double or multiple pairs. The particular arrangement employed will be determined by the type of filtration unit being used and its application, the nature of the liquid employed and the waste to be collected, and the arrangement of the belt and pulley assemblies and the materials used.

Although the conveyor belt shown in the drawings and described above includes only two rails disposed at opposite edges of the belt, a third or additional rails may be added to provide additional control. Such a configuration may be particularly advantageous for wider belts.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

What is claimed is:

1. Conveyor apparatus comprising:
an elongated endless belt;
means for driving and supporting said belt;
a pair of flexible rails extending along said belt at the edges thereof and secured to said belt on the surface thereof opposite from the surface which is arranged to contact drive and support members for said belt;
a pair of resilient edging strips of low friction material extending along said edges of said surface of said belt which is arranged to contact said drive and support members;
and a pair of separately mounted pulleys immovable in the direction of movement of said belt and positioned one at each edge of said belt and along a predetermined path, said pulleys having grooved rims which individually engage said rails, whereby said belt is constrained to follow said predetermined path.

2. Conveyor apparatus comprising:
an elongated endless belt;
means for driving and supporting said belt;
a pair of flexible rails extending along said belt at the edges thereof and secured to said belt on the surface thereof opposite from the surface which is arranged to contact drive and support members for said belt;
a pair of separately mounted pulleys immovable in the direction of movement of said belt and positioned one at each edge of said belt and along a predetermined path, said pulleys having grooved rims which individually engage said rails, whereby said belt is constrained to follow said predetermined path;
and means for moving said pulleys vertically to vary the engagement of said pulleys and said rails.

3. Conveyor apparatus comprising:
an elongated endless belt;
means for driving and supporting said belt;
a pair of flexible rails extending along said belt at the edges thereof and secured to said belt on the surface thereof opposite from the surface which is arranged to contact drive and support members for said belt;
a pair of resilient edging strips of low friction material extending along said edges of said surface of said belt which is arranged to contact said drive and support members;
a pair of grooved guiding means immovable in the direction of movement of said belt and positioned one at each edge of said belt and along a predetermined path for individually engaging said rails, whereby said belt is constrained to follow said predetermined path;
and means for moving said pulleys vertically to vary the engagement of said pulleys and said rails.

4. Conveyor apparatus comprising:
a horizontally disposed endless conveyor belt having an upper run and a lower run;
means for driving and supporting said belt;
a pair of flexible rails extending along said belt at the edges thereof and secured to said belt on the surface thereof opposite from the surface which is arranged to contact drive and support members for said belt;
and a plurality of pairs of separately mounted pulleys immovable in the direction of movement of said belt and positioned along a predetermined path, one pulley of each pair positioned at each edge of said belt, said pulleys having grooved rims which individually engage said rails, whereby said belt is constrained to follow said predetermined path, at least one pair of said pulleys engaging said rails along said upper run of said belt and at least one pair of said pulleys engaging said rails along said lower run of said belt.

5. Conveyor apparatus comprising:
an elongated endless belt;
means for driving and supporting said belt;
a pair of flexible rails extending along said belt at the edges thereof and secured to said belt on the surface thereof opposite from the surface which is arranged to contact drive and support members for said belt;
a pair of resilient edging strips of low friction material extending along said edges of said surface of said belt which is arranged to contact said drive and support members;
a pair of separately mounted pulleys immovable in the direction of movement of said belt and positioned one at each edge of said belt and along a predetermined path, said pulleys having grooved rims which individually engage said rails, whereby said belt is constrained to follow said predetermined path;

and means for moving said pulleys vertically to vary the engagement of said pulleys and said rails.

References Cited

UNITED STATES PATENTS

| | | | |
|---|---|---|---|
| 265,302 | 10/1882 | Brigham | 198—193 |
| 1,100,654 | 6/1914 | Church | 198—193 X |
| 1,357,256 | 11/1920 | Sargent | 198—193 |
| 1,628,436 | 5/1927 | Segrin et al. | 198—202 |
| 2,347,365 | 4/1944 | Paradise | 198—184 |
| 2,375,065 | 5/1945 | Askue | 198—202 |
| 2,515,778 | 7/1950 | Knowland. | |
| 2,863,555 | 12/1958 | Jaritz | 198—202 X |
| 3,077,990 | 2/1963 | Peterson | 198—202 X |
| 3,129,806 | 4/1964 | Stiltner | 198—193 |

FOREIGN PATENTS

| | | |
|---|---|---|
| 227,256 | 11/1958 | Australia. |
| 770,320 | 6/1934 | France. |
| 956,926 | 1/1957 | Germany. |
| 1,073,943 | 12/1957 | Germany. |

EVON C. BLUNK, *Primary Examiner.*

M. L. AJEMAN, *Assistant Examiner.*